Patented Mar. 18, 1924.

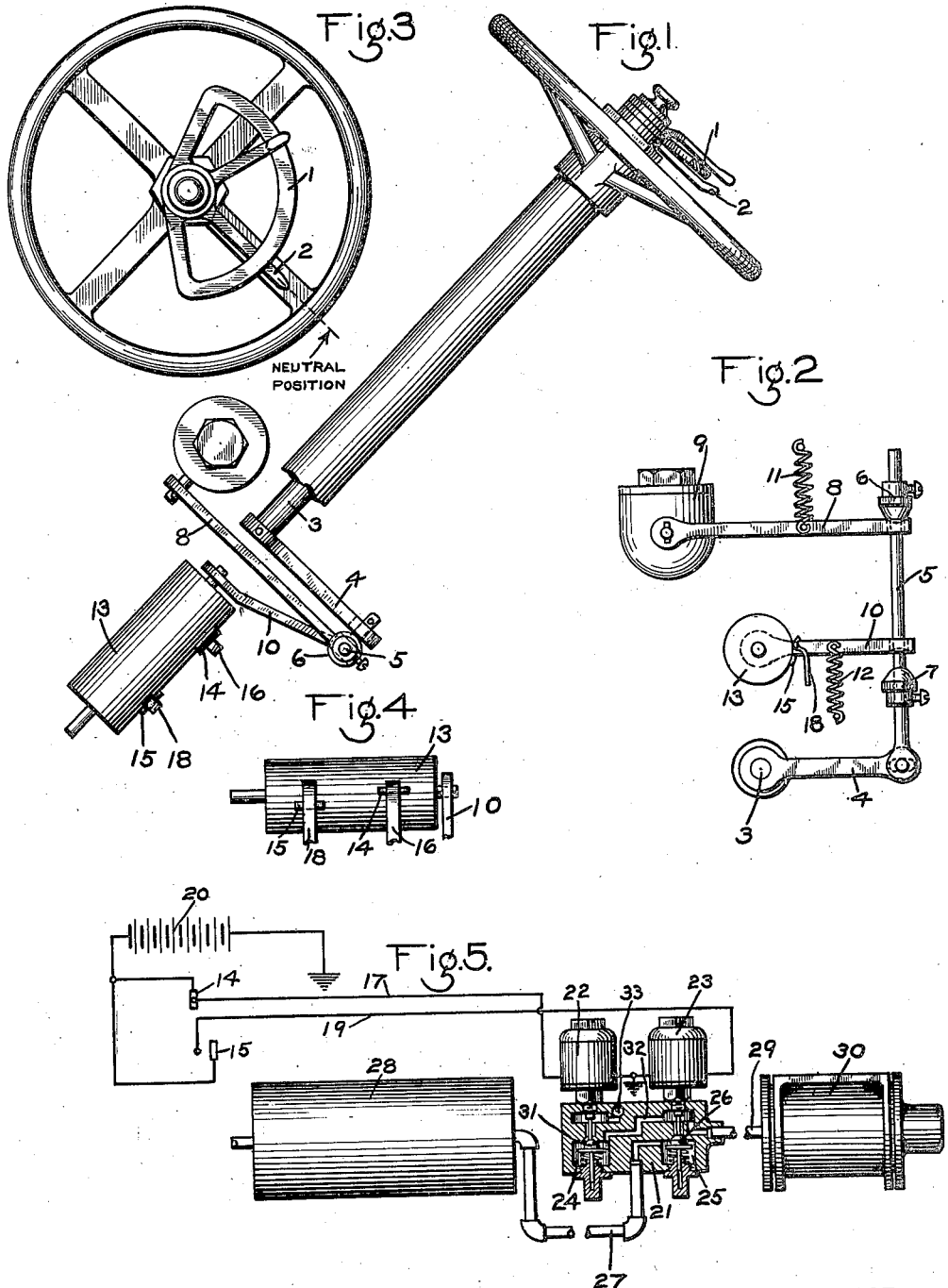

1,486,932

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE.

Application filed May 5, 1921. Serial No. 467,041.

*To all whom it may concern:*

Be it known that I, CARLTON D. STEWART, a citizen of the United States, residing at Berkeley, in the county of Alameda and State of California, have invented new and useful Improvements in Vehicle Brakes, of which the following is a specification.

This invention relates to brakes, and more particularly to a brake controlling device for motor vehicles.

The principal object of my invention is to provide means for controlling the brakes through the manipulation of the means for controlling the application of power to the vehicle.

Other objects will appear in the following more detailed description of the invention.

In the accompanying drawing; Fig. 1 is an elevational view of the steering and power control mechanism of a motor vehicle, showing my invention applied thereto; Fig. 2 an inverted plan view of the construction shown in Fig. 1; Fig. 3 a plan view of the steering wheel portion; Fig. 4 a side elevation of the contact drum; and Fig. 5 a diagrammatic view, showing the vehicle brake apparatus and the wiring connections thereto.

According to my invention, the usual hand throttle for controlling the power is also employed for controlling the brakes of the vehicle and for this purpose, the usual quadrant is extended, so that the hand throttle lever may be moved through a certain arc, from the usual idling position, for controlling the brakes.

As shown in the drawing, the quadrant 1 of the hand throttle lever 2 is extended to permit excess movement of the throttle lever beyond the usual idling position.

Connected to the usual throttle shaft 3 is a lever 4 for operating a stem 5 and on the stem are secured adjustable stops 6 and 7.

The stop 6 is adapted to engage the end of a lever 8 for operating the usual carburetor 9 upon movement of the stem 5 in one direction and the stop 7 is adapted to engage a lever 10 for controlling the brakes upon movement of the stem 5 in the opposite direction.

A coil spring 11 attached to the lever 8 tends to resist movement of the lever by the stop 6 and a coil spring 12 attached to the lever 10 tends to resist movement of the lever by the stop 7.

The movement of the lever 10 may be utilized to control any desired type of brake including fluid pressure brakes, but in the drawing, the lever is arranged to control an electro-pneumatic brake.

For this purpose, a contact drum 13 is connected to the lever 10, so that the movement of said lever rotates the drum. On the drum 13 may be two contacts 14 and 15, the contact 14 being engageable by a contact finger 16 connected to a train wire 17 and the contact finger engageable by a contact finger 18 connected to a train wire 19, said contacts 14 and 15 being connected to a grounded source of current 20.

At a convenient place on the vehicle is mounted an electro-pneumatic valve device comprising a valve head 21, a release magnet 22, and an application magnet 23. The release magnet 22 has one terminal connected to the train wire 17 and the application magnet 23 has one terminal connected to the train wire 19, the other terminal of each magnet being connected to ground, as shown.

In the valve head 21 is a valve chamber 24 containing a release valve 31, adapted to be operated by the magnet 22 and a valve chamber 25, containing an application valve 26, adapted to be operated by magnet 23.

Connected by pipe 27 to valve chamber 25 is a reservoir 28, which is normally charged with fluid under pressure and connected by pipe 29 to valve chamber 24 is a brake cylinder 30, the admission and release of fluid under pressure to and from the brake cylinder, being adapted to effect the application and release of the brakes on the vehicle.

In the usual idling position, which may also be termed the neutral position of the throttle lever 2, the stop 6 engages the lever 8 and movement of the throttle lever 2 counter-clockwise from the neutral position, rotates the shaft 3 so as to depress the rod 5 and cause the stop 6 to shift the carburetor lever 8.

In the neutral or idling position, the stop 7 does not engage the lever 10 and the drum 13 is in position so that the contact finger 16 engages the contact 14. The circuit is thus closed through the train wire 17, so that the release magnet 22 is energized to open the release valve 31 and thereby connect the brake cylinder 30 through passage 32 and valve chamber 24 with the atmospheric exhaust port 33.

When it is desired to apply the brakes, the lever 2 is turned clockwise from the neutral or idling position, so as to rotate the shaft 3 in a direction for lifting the stem 5. After the lost motion is taken up, the stop 7 engages the lever 10 and the drum 13 is rotated, so that the contact 14 is moved out of contact with the contact finger 16, while the contact 15 is moved into contact with the contact finger 18.

The release magnet is then deenergized so as to permit the release valve 31 to close and the application magnet 23 is energized to open the valve 26 and permit fluid under pressure to flow from the reservoir 28 through pipe 27 to valve chamber 25 and thence past the open valve 26 to pipe 29 and the brake cylinder 30.

When the brakes have been applied with sufficient pressure and it is desired to hold the pressure in the brake cylinder, the lever 2 may be moved back toward the neutral position, so that the contact 15 moves out of engagement with finger 18 but not far enough to cause the contact 14 to engage finger 16. In this position, therefore, both the application magnet circuit is opened to prevent further supply of fluid to the brake cylinder 30 and the release magnet circuit is opened to close the release valve 31 and prevent the escape of fluid from the brake cylinder.

The brakes may be either wholly or partially released by moving the lever 2 back to neutral position, in which the release magnet 22 is energized, according to the length of time the lever 2 is allowed to remain in the neutral position.

It will now be apparent that with the above described construction, the vehicle brakes may be readily controlled by merely moving the usual throttle lever through an additional range of movement.

Having now described my invention, what I claim as new and desire to secure by Letters Patent, is:—

1. In a motor vehicle control apparatus, the combination with a carburetor and a lever for operating same, of an electro-pneumatic brake apparatus, a contact drum for controlling the circuits of said apparatus, a lever for operating said drum, and a throttle lever operatively connected to said levers.

2. In a motor vehicle control apparatus, the combination with a vehicle brake apparatus, of a manually operated lever having a range of movement for controlling the power, a position for operating said apparatus to apply the brakes, a position for releasing the brakes, and an intermediate position for holding the brakes applied.

In testimony whereof I have hereunto set my hand.

CARLTON D. STEWART.